Oct. 27, 1970     A. O. WIST     3,535,913
DIFFERENTIAL THERMAL ANALYSIS APPARATUS
Filed Feb. 2, 1968     2 Sheets-Sheet 1
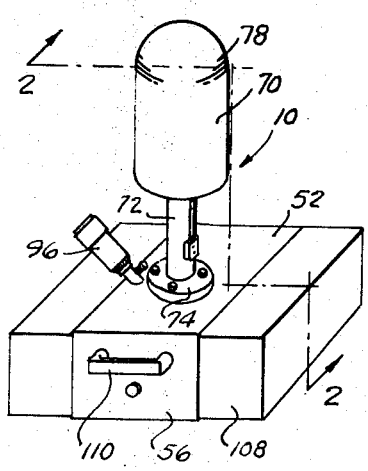
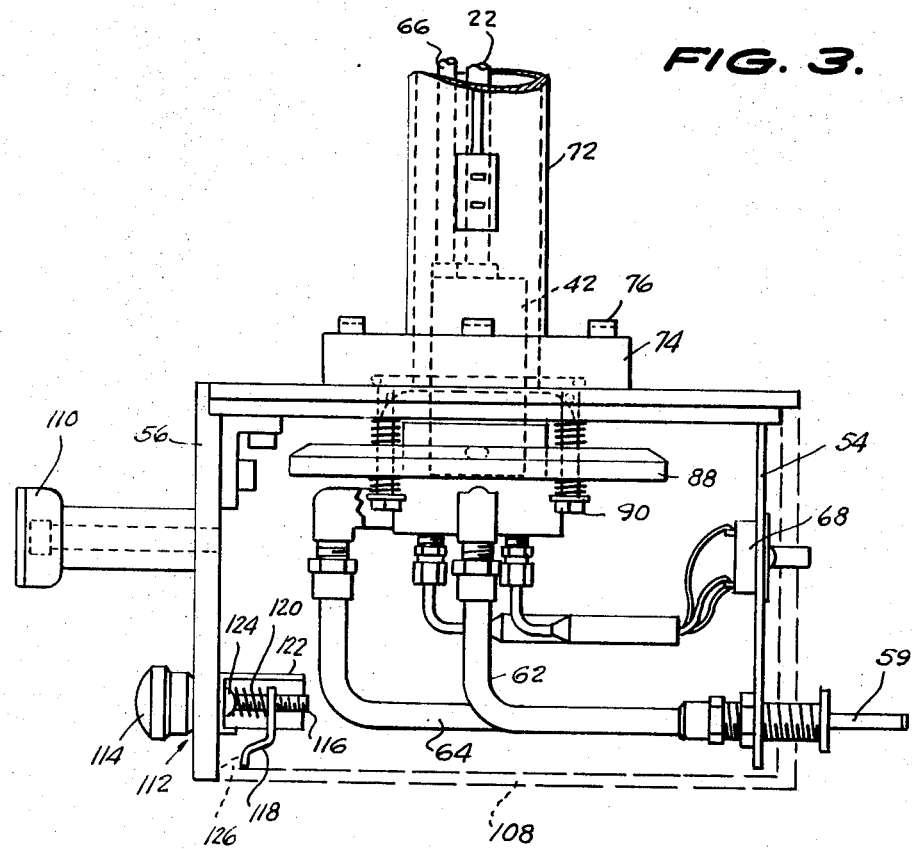
INVENTOR.
ABUND O. WIST,
BY
ATTORNEYS.

Oct. 27, 1970  A. O. WIST  3,535,913
DIFFERENTIAL THERMAL ANALYSIS APPARATUS
Filed Feb. 2, 1968  2 Sheets-Sheet 2

INVENTOR.
ABUND O. WIST,
BY
Berman, Davidson & Berman
ATTORNEYS.

United States Patent Office 3,535,913
Patented Oct. 27, 1970

3,535,913
DIFFERENTIAL THERMAL ANALYSIS
APPARATUS
Abund O. Wist, 155 Longue Vue Drive,
Pittsburgh, Pa. 15228
Filed Feb. 2, 1968, Ser. No. 702,681
Int. Cl. G01n 25/02
U.S. Cl. 73—15                           8 Claims

ABSTRACT OF THE DISCLOSURE

Apparatus for performing differential thermal analysis including a holder block for a sample and reference substance, supported in an electric furnace. The holder contains a sample and reference substance mounted on the ends of a thermocouple pair, measuring the differential voltage developed, as the sample and reference substance are heated at a programmed rate. To insure accurate results, it is necessary that even heat distribution occurs from the furnace to the sample and reference substance. Therefore, the apparatus is provided with a tiltable bracket, supporting the holder block, which when tilted will move the holder block towards or away from the furnace wall to compensate for any uneven heat distribution.

---

This invention relates to testing apparatus, and more particularly, apparatus for use in conducting differential thermal analysis.

Differential thermal analysis is a technique used for observing changes in the energy level of a sample substance as a function of temperature. The changes may be observed by providing a pair of thermocouples connected in opposing electrical relationship, placing a sample substance near one of the thermocouples and a reference substance near the other, heating the sample substance and the reference substance at a programmed rate, and observing the differential voltage developed by the pair of thermocouples. The voltage differential developed is proportional to the changes in energy level of the known or reference substance.

The differential voltage developed may be traced on a chart by conventional techniques to form a record of the differential voltage over the heating range. Usually, a standard thermocouple is disposed near the differential thermocouples to indicate the actual temperature around the sample in order to plot on the chart the differential voltage against the actual temperature.

The graphs obtained are characteristic of the sample substance with respect to the reference substance, and may be employed for identification purposes. The graphs are also useful in the determination of the characteristics of a known sample substance, such as melting point, vaporization point, temperature at which a change in crystalline structure occurs, and the like. If a reactive substance or a reactive atmosphere is placed around or sufficiently near the sample substance, the temperature of reaction can also be obtained by the above technique. The magnitude of the differential voltage indicates the heat of reaction.

Although the differential thermal analysis technique is basically simple, the apparatus must be very sensitive and able to detect and convey to the graph truly representative characteristics of the sample substance. One difficulty with prior apparatus has been the maintenance of identical enviroments for the sample and reference subtance so they can be truly compared under identical conditions. A critical problem in maintaining this identical environment is to effect even heat transfer from the heat source to the sample and reference substances.

Accordingly, it is an object of this invention to provide differential thermal analysis apparatus which may be adjusted to maintain identical testing environments for the reference and sample substances being compared.

A specific object of this invention is to provide differential thermal analysis apparatus which may be adjusted to effect even heat transfer from the heat source to the sample and reference surfaces.

Further objects and advantages of the invention will become apparent from the following description and claims, and from the accompanying drawings, wherein:

FIG. 1 is a perspective view of the differential thermal analysis apparatus of the present invention;

FIG. 3 is a cross-sectional view taken substantially along the plane indicated by line 3—3 of FIG. 2;

Figure 2:
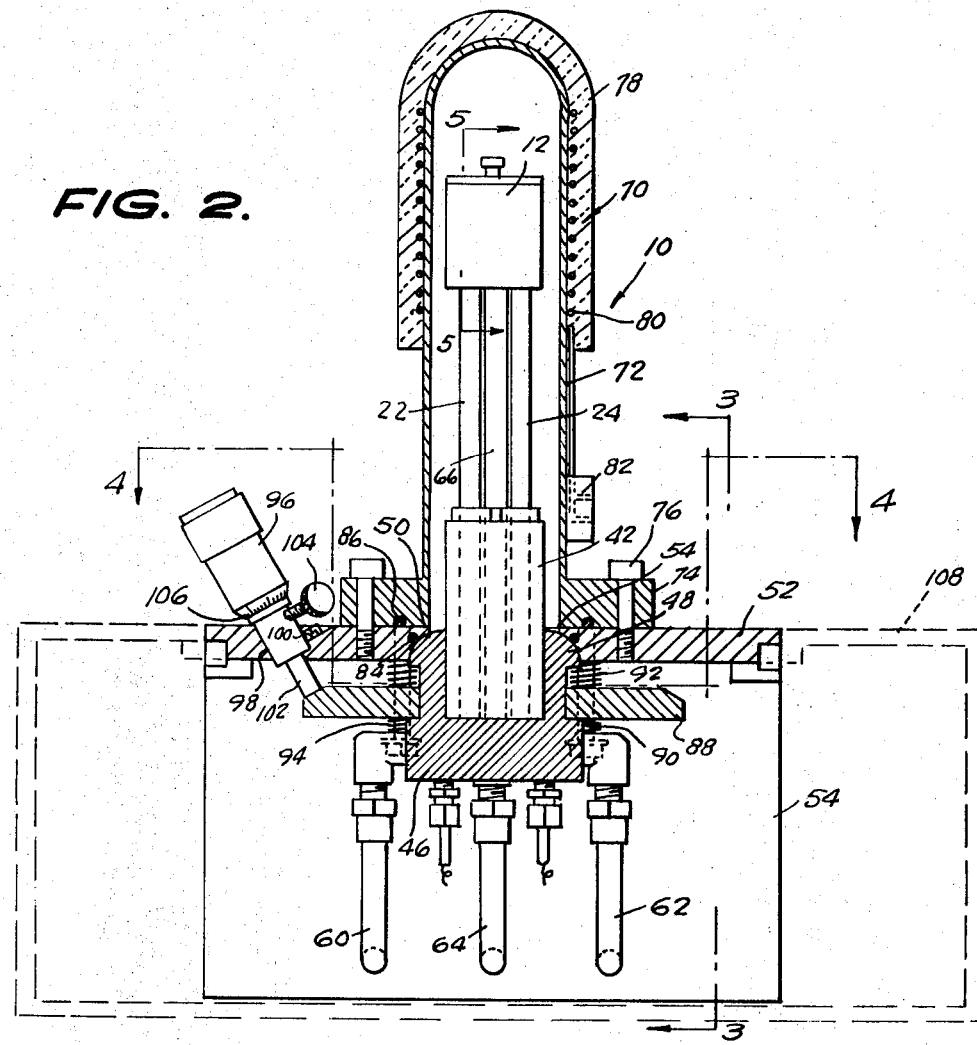
FIG. 2 is a cross-sectional view taken substantially along the plane indicated by line 2—2 of FIG. 1.
Figure 5:
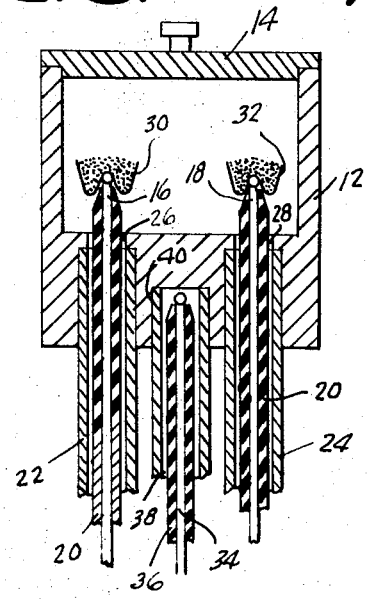
FIG. 5 is a cross-sectional view taken substantially along the plane indicated by line 5—5 of FIG. 2.
Figure 4:
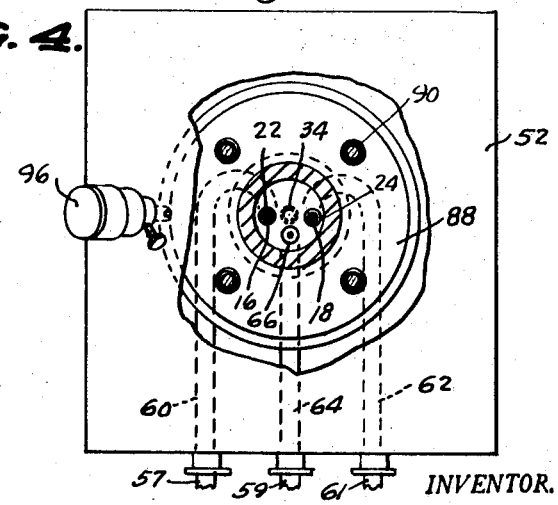
FIG. 4 is a cross-sectional view taken substantially along the plane indicated by line 4—4 of FIG. 2, with certain portions broken away for purposes of illustration.

Referring now to the drawings in detail, wherein like numerals indicate like elements throughout the several views, the differential thermal analysis apparatus 10 includes a sample holder block 12 and a cap 14 fitting over the block 12.

Disposed within the interior of block 12, away from the walls thereof, are a pair of thermocouples 16 and 18. Thermocouple 18 constitutes the reference thermocouple, while thermocouple 16 is adapted to indicate the change in energy level of a sample substance relative to the reference or known substance.

Each of the thermocouples 16 and 18 is shrouded by a protective sheath 20 of insulating material. The shrouded thermocouples 16 and 18 extend through and are spaced from the walls of a conduit 22 and a conduit 24 respectively, affixed to the bottom of block 12. Conduits 22 and 24 are press-fitted into bores 26 and 28, extending through the bottom wall of block 12 into the open interior space thereof.

At their exposed upper ends, thermocouples 16 and 18 support a sample substance holder 30 and a reference substance holder 32, respectively, within the interior of block 12. At their opposite ends, thermocouples 16 and 18 are connected in opposing electrical relationship.

A third standard thermocouple 34 is provided for indicating the actual temperature around the sample, and is disposed in an insulating, protective sheath 36. Thermocouple 34 is supported in a conduit 38, press-fitted into a bore 40, in the bottom surface of block 12.

At their lower ends, the thermocouples 16, 18 and 34, protective sheaths 20 and 36, and conduits 22, 24 and 38, extend through a protective sealing-block 42, supported in a central bore 44 of a pivotable mounting bracket 46. The thermocouples, sheaths, and conduits are sealed within the mounting bracket 46, and rigidly supported therein.

Mounting bracket 46 has an approximate spherical upper end 48 snugly held in engagement with a complementally shaped seat 50, formed in the bottom surface of furnace support platform 52. Platform 52 includes a centrally located opening 54 through which sealing-block 42 extends.

Platform 52 has perpendicular end walls 54 and 56 fixed thereto. Supported by end wall 54 in parallel, spaced relation, are three automatic gas connectors. Gas connectors 57 and 61 dispense gas into flexible, gas inlet conduits 60 and 62, while connector 59 receives gas upon its return from flexible conduit 64. Conduits 60 and 62 connect with internally formed passageways in bracket 46 leading to conduits 22 and 24, respectively. Conduit 64 connects with an internal passageway in bracket 46 leading to a gas return conduit 66, sealed in mounting bracket 46 and extending through sealing block 42 and sample holder block 12 into the interior of block 12.

End wall 54 also supports a thermocouple terminal block 68 having electrical leads to each of the thermocouple units sealed within bracket 46. Block 68 is adapted to be electrically connected to associated recording equipment.

Bracket 46 is supported with its upper end 48 snugly held in engagement with seat 50, by an annular ring 88 welded or otherwise fixedly secured to the bracket. Four studs 90, extending through enlarged bores in ring 88, are threadedly connected to the lower surface of platform 52. Encircling each stud 90, between ring 88 and platform 52, is a coil spring 92. Encirling each stud 90, between ring 88 and the head of the stud, is another coil spring 94. Springs 92 and 94 floatingly support ring 88, and hence, bracket 46, so that the upper end 48 of the bracket can tilt or pivot slightly on seat 50 until the ring binds on studs 90.

Mounted on platform 52 is a furnace unit generally designated by the numeral 70. Furnace unit 70 includes a tubular sheath or tub 72 having an integral, annular mounting flange 74 at its lower end. The flange 74 of sheath 72 is secured to platform 52 in coextensive relationship to opening 54, by threaded studs 76. Seated on the upper end of sheath 72 is an electric furnace 78, having an electrical winding 80 adapted to be connected to a suitable power source through an electrical receptacle 82 fastened to the sheath 72. As shown in FIG. 2, furnace 78 surrounds sample holder block 12. Annular seals 84 and 86 prevent any gas leaking from the interior of sheath 72 and sample block holder 12.

In use and operation, furnace unit 70 is removed from platform 52, and a test and known substance are placed in holders 30 and 32, respectively. The furnace unit is replaced, and a power source connected to receptacle 82, to activate furnace 78.

An inert gas of known composition is admitted through conduits 60 and 62, and connecting conduits 22 and 24, into the interior of sample block 12. The gas is removed through conduits 66 and 64. The gas sweeps away any gases evolved from heating the sample, and thus maintains a known composition around the sample at all times.

As the sample and reference substances are heated at a programmed rate, the thermacouples 16 and 18 will develop a differential voltage, which can be recorded by conventional equipment for this purpose, connected to thermocouple terminal block 68. Thermocouple 34 will provide a reference for the actual temperature of the sample holder block 12.

Inaccuracies may occur if, during the operation of the apparatus, the sample and reference substance are not heated uniformly at the same rate. This may be noticed, for example, prior to the actual test, by running the furnace without any materials in sample block holder 12. If the differential voltage registered is not zero, this would indicate uneven heat distribution in the holder 12.

With the apparatus of the present invention, this situation may easily be rectified by pivoting or tilting ring 88 and bracket 48 on seat 50. This tilting movement will cause sample block holder 12 to move closer or away from sheath 72 to compensate for any uneven heat distribution of furnace 78. This adjustment can be accomplished by trial and error until the differential voltage registered by thermocouples 16 and 18 is again zero.

In order to tilt ring 88 and bracket 46, a micrometer 96 is supported at an angle in a bore 98 in platform 52, by means of a set screw 100. The shank 102 of micrometer 96 is placed in abutment with ring 88, and is used to push the ring to cause bracket 46 to rotate on seat 50. When the correct adjustment has been attained, set screw 104 is used to lock shank 102, and prevent its further rotation. The micrometer dial 106 will provide a visual record of the correct setting for shank 102.

Platform 52 and the apparatus attached thereto is adapted to be slid into and out of a housing 108 by a handle 110 secured to the end wall 56 of platform 52. Housing 108 protects the apparatus, when in use, but the whole unit can be removed for maintenance or repair.

A lock 112 is also provided for preventing platform 52 from being removed from the housing 108. Lock 112 includes a knob 114, having a threaded shank 116 extending through end wall 56. A latch plate 118 is threaded on shank 116, and a coil spring 120 is compressed between latch plate 118 and end wall 56, to retain knob 114 substantially flush with end wall 56.

A stop plate 122 is connected to end wall 56 by a threaded fastener 124, and extends above and to one side of shank 116. Accordingly, latch plate 118 can be rotated clockwise, as viewed in FIG. 3, by knob 114, to position it in abutment with a projection 126 on the bottom of housing 108, and prevent axial movement of platform 52. Counterclockwise rotation in FIG. 3, will enable latch plate 118 to be moved out of engagement with projection 126, so platform 52 can be removed.

While a specific embodiment of my invention has been disclosed in the foregoing description, it will be understood that various modifications within the spirit of the invention may occur to those skilled in the art. Therefore it is intended that no limitation be placed on the invention except as defined by the scope of the appended claims.

I claim:

1. An apparatus for performing differential thermal analysis comprising a furnace, a bracket pivotally-mounted with respect to said furnace, support means rigidly-secured to said bracket and extending into said furnace, means to support two substances on said support means, temperature-measuring means adapted to be associated with said substances for developing a differential voltage proportional to the changes in the energy levels of said substances as they are heated by said furnace, and means to tilt the bracket relative to the furnace for adjusting the support means relative to the wall of the furnace to effect even heat transfer from said wall to each of said substances, wherein said furnace includes a platform having an opening communicating with the interior of the furnace, said support means extending through said opening, the pivotal mounting of the bracket comprising a snug ball-and-socket connection between the bracket and the platform at said opening whereby the bracket is positively constrained for tilting adjustment relative to the platform.

2. The apparatus of claim 1, wherein the means to support the two substances comprises a pair of spaced sample holders mounted on said support means.

3. The apparatus of claim 1, and wherein said ball-and-socket connection comprises a substantially spherical seat cut in said platform at said opening and a complementally shaped head on said bracket in snug engagement with said seat.

4. The apparatus of claim 1, and wherein the means to tilt the bracket comprises an abutment member movably mounted relative to the platform and engaging a portion of the bracket.

5. The apparatus of claim 4, and wherein said bracket portion comprises a ring on the bracket and said abutment member comprises an extensible member projecting from said platform and abutting said ring.

6. The apparatus of claim 5, and means suspending said ring from said platform for limited pivotal movement relative to said platform.

7. The apparatus of claim 5, and wherein said extensible member comprises the shank of a micrometer mounted on said platform.

8. The apparatus of claim 5, and spring means bearing between said ring and said platform for resiliently limiting pivotal movement of the bracket relative to the platform.

References Cited

UNITED STATES PATENTS

| | | | |
|---|---|---|---|
| 1,172,281 | 2/1916 | Halvorsen | 33—118 |
| 3,285,053 | 11/1966 | Mazieres | 73—15 |

OTHER REFERENCES

McAdie: "Simultaneous D.T.A. and Thermogravimetric Analysis Using the Open-Pan Type of Sample Holder,"

In Analytical Chemistry, November 1963, vol. 35, p. 1840–1844.

JAMES J. GILL, Primary Examiner

H. GOLDSTEIN, Assistant Examiner